United States Patent Office 3,070,632
Patented Dec. 25, 1962

3,070,632
PROCESS FOR PREPARATION OF
METHYL MERCAPTAN

John F. Olin, Dayton, Ohio, and Bernard Buchholz, Flourtown, Bernard Loev, Broomall, and Roland H. Goshorn, Fort Washington, Pa., assignors to Pennsalt Chemicals Corporation, Philadelphia, Pa., a corporation of Pennsylvania
No Drawing. Filed Dec. 21, 1959, Ser. No. 860,721
17 Claims. (Cl. 260—609)

This invention relates to a novel process for the manufacture of methyl mercaptan ($CH_3SH$) and, in particular, deals with its preparation by a catalytic reaction of carbon oxides with hydrogen and hydrogen sulfide.

Methyl mercaptan is a well known chemical of commerce useful as an intermediate to agricultural chemicals, plastics, rubber chemicals, and the like and has been prepared by numerous known methods. A very economical and attractive commercial method is by reaction of hydrogen sulfide and methanol. It is obvious, however, that still greater economies could be achieved by using more basic starting materials, e.g., carbon oxides. The process of this invention uses such basic reactants and is particularly economical for very high production levels of methyl mercaptan and advantageously lends itself to continuous production.

The process of this invention involves reaction of a carbon oxide (e.g., carbon monoxide and carbon dioxide) with hydrogen and hydrogen sulfide in the presence of a sulfactive catalyst. In a preferred embodiment giving improved conversions an organic base such as an aliphatic, cycloaliphatic, or saturated heterocyclic amine is also employed in the reaction medium. This process can be considered as a reductive thiolation of carbon oxides and may be represented by the following equations:

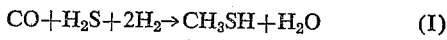
$$CO + H_2S + 2H_2 \rightarrow CH_3SH + H_2O \qquad (I)$$

and

$$CO_2 + H_2S + 3H_2 \rightarrow CH_3SH + 2H_2O \qquad (II)$$

The sulfactive catalysts used in the process are known in the art as those metal sulfides which are not poisoned by sulfur and are at the same time active reduction catalysts (see columns 8 and 9 of U.S. Patent 2,402,639, for example). These sulfactive catalysts are sulfides of hydrogenating metals such as chromium, cobalt, copper, iron, lead, molybdenum, nickel, palladium, tin, tungsten and vanadium, but for practical and economical use, due to their outstanding activity, the sulfactive catalysts of iron, cobalt, nickel and molybdenum are preferred. These catalysts are readily prepared by numerous methods and these methods include (1) treatment of finely divided pyrophoric or activated metal with sulfur or $H_2S$, (2) precipitation of the metal sulfide from a solution of the metal salt with $H_2S$ or with an alkali metal, alkaline earth metal or ammonium sulfide or polysulfide, and (3) heating powdered metal or their compounds such as oxides or carbonates with sulfur, $H_2S$ or $CS_2$. It will be understood that the sulfide catalyst may be prepared in situ by any of the above methods or by other means. It will also be understood that each of these sulfactive catalysts may be used alone or as a mixture of such sulfides. If desired, other substances may be present such as kieselguhr, alumina, magnesia, carbon and other supporting or promoter materials.

The process of this invention may be carried out either batchwise or in a continuous manner. In the batch procedure the reactants and catalyst are charged to an autoclave and while being agitated the reaction is allowed to proceed at elevated temperature and under autogeneous pressure. Temperatures and pressures are not critical, but the temperatures employed will usually be between about 100° and about 400° C. and the pressures generated will vary inversely with temperature and will usually be between about 15 and 200 atmospheres. Pressures up to 50,000 pounds per square inch and higher may also be used by pressuring the gases into the autoclave. The time for completion of the reaction will, of course, vary with the reaction conditions employed, but in general, the reaction will be essentially complete after about one to about six hours. Unusually long reaction times should be avoided since there is evidence that conversion is decreased after about 20 hours. At the end of the desired reaction time, the autoclave is cooled, the gases vented, the methyl mercaptan separated from other gaseous products which may be present (e.g., by condensation at low temperature) and purified, if desired, before compressing into cylinders for storage and sale.

In the continuous procedure of operation of the reactants (i.e., the carbon oxide, hydrogen, hydrogen sulfide, and amine) are premixed and passed into a fixed or fluid bed reactor containing the catalyst at a temperature and pressure within the range indicated above. As the gases exit from the reactor, the methyl mercaptan is separated and any unreacted reactants recycled.

The amount of sulfactive catalyst which may be used in this process may be varied considerably and is not critical. Depending upon the particular catalyst used and upon other conditions of operation, the amount of catalyst employed in a batch process will normally range from about 0.5% to about 50% by weight of the total reactants taken. In continuous processes very large ratios of catalyst to reactants in the reactor will be used, the amount of catalyst being up to about 99% of the total reactants. However, in continuous processes, space velocities are more meaningful to express the relationship between the reactants and catalyst. Space velocities from about 150 to 1500 (preferably 300 to 700) liters of gas at standard temperature and pressure per liter of catalyst per hour will be used. The significant factor in either process is to ensure contact between catalyst and reagents and the means for this will be obvious to the skilled artisan, depending on the type of equipment used and conditions selected for the process. The better the means for ensuring contact the less catalyst that need be used.

As indicated, in addition to use of a sulfactive catalyst, the process of this invention in its preferred embodiment is carried out in the presence of an aliphatic, cycloaliphatic or saturated heterocyclic amine. Such amines will preferably contain from one to six carbon atoms in each aliphatic or cycloaliphatic or heterocyclic radical and will include the primary, secondary and tertiary alkyl and cycloalkyl and heterocyclic amines such as methyl amine, ethylamine, isopropylamine, n-butylamine, sec-butylamine, the isomeric amylamines, cyclohexylamine, dimethylamine, diisopropylamine, dicyclohexylamine, triethylamine, triisobutylamine, pyrrolidine, piperidine, piperazine, morpholine and the like. The saturated heterocyclic amines are preferred and of these piperidine is preferably used.

The amounts of reactants (i.e. carbon oxide, hydrogen and hydrogen sulfide) used in this process will be based on the stoichiometry of Equations I and II above. In general, however, an excess over theory of hydrogen and hydrogen sulfide will preferably be used. The amount of amine employed may be varied considerably, as for example, from 0.1 to 10 times the weight of the sulfactive catalyst. The preferred amount of amine used will be from about 0.5 to 5 times the weight of sulfactive catalyst taken. In the continuous process the amine may be continuously or periodically fed into the catalyst chamber to restore any decreased activity.

In order to further illustrate the details of this invention, the following examples are given.

EXAMPLE I

A suspension of 10 g. of catalyst which consists of nickel sulfide on activated alumina (27% by weight nickel) and 20 cc. of piperidine is placed in an autoclave. The autoclave is sealed and is then charged with carbon monoxide (0.08 mole), hydrogen sulfide (0.16 mole), and hydrogen (0.32 mole). The charged autoclave is heated to 300° C. and held at this temperature with vigorous agitation for three hours during which time a maximum pressure of 1700 p.s.i.g. is developed.

The autoclave is then cooled and the gaseous products are vented through a sampling device on a gas chromatograph. Analysis shows 17.7% conversion to methyl mercaptan based on the carbon monoxide charged.

Additional runs made in the same manner are listed in the following table:

*Table I*

| Run | Temp., °C. | Time (hours) | Max. pressure (p.s.i.g.) | Percent conversion to $CH_3SH$ |
|---|---|---|---|---|
| (1) | 300 | 3.5 | 1,800 | 0.0 |
| A | 300 | 1 | 1,750 | 5.7 |
| B | 300 | 3 | 1,700 | 17.7 |
| C | 295 | 5.5 | 1,800 | 15.4 |
| D | 310 | 22.5 | 1,400 | 1.9 |

[1] No carbon oxide.

EXAMPLE II

Example I is repeated at 295° C. except that 40 cc. of piperidine is used. The reaction time is four hours (maximum pressure is 1750 p.s.i.g.). A 23.2% conversion to methyl mercaptan is obtained.

EXAMPLE III

When a cobalt sulfide catalyst (prepared by the method of Example I of U.S. Patent 2,402,613) is used in Example I instead of the supported nickel catalyst, methyl mercaptan is likewise obtained.

EXAMPLE IV

When Example I is repeated with carbon dioxide instead of carbon monoxide, $CH_3SH$ is likewise obtained and identified.

EXAMPLE V

A suspension of 10 g. of a finely divided nickel sulfide on alumina catalyst (27% nickel) in 40 cc. diisopropylamine is placed in a stainless steel autoclave. The autoclave is charged with 0.08 mole carbon monoxide, 0.16 mole hydrogen sulfide and 0.32 mole hydrogen. The autoclave is heated to 300° C. with agitation for four hours during which time a pressure of 1800 p.s.i.g. develops. Analysis of the product gases indicates a conversion to methyl mercaptan of about 18%.

EXAMPLE VI

In a 300 ml. stainless steel autoclave are placed 40 g. of dicyclohexylamine and 10 g. of a pulverized alumina catalyst containing 27% nickel as nickel sulfide. The autoclave is sealed and charged to 200 p.s.i.g. with hydrogen sulfide to 300 p.s.i.g. with carbon monoxide and finally to 700 p.s.i.g. with hydrogen. The autoclave is heated at 295° C. with vigorous agitation and held for four hours at 1750 p.s.i.g. The gaseous product mixture, analyzed by vapor chromatograph, shows a 17.8% conversion of the carbon monoxide to methyl mercaptan.

EXAMPLE VII

A catalyst (10 g.) composed at 42% by weight of nickel sulfide on finely divided alumina is suspended in 40 ml. of triethylamine and placed in a stainless steel autoclave. The autoclave is sealed, charged with 0.08 mole carbon monoxide, 0.16 mole hydrogen sulfide and 0.32 mole hydrogen, and heated with vigorous agitation at 290° C. for four hours. A 15% conversion to methyl mercaptan is obtained.

Iron and molybdenum sulfide catalysts give comparable results when used in place of nickel sulfide in the above example.

EXAMPLE VIII

A mixture of 790 g. (17.9 moles) of carbon dioxide, 620 g. (18.45 moles) of hydrogen sulfide, 15 g. of nickel sulfide and 1500 cc. of dioxane is charged into a stainless steel autoclave. The autoclave is then charged at 26° C. with hydrogen to a pressure of 1250 p.s.i.g. The reaction mass is then heated while stirring to 195° C. over a 3–5 hour period. After cooling, the pressure is released, and the gases are vented through Dry Ice condensers. Fractionation of the condensate confirms the formation of methyl mercaptan.

EXAMPLE IX

A vapor phase process is carried out as follows:

Hydrogen, hydrogen sulfide and the carbon oxide are passed at atmospheric pressure through a preheater into a heated stainless steel reactor charged with catalyst. The outlet of the reactor is connected to a Dry Ice condenser and the products condensed are distilled and fractionated. Unreacted carbon oxide and $H_2S$ are separated and the remaining vapors are passed through a tube packed with $Fe_2O_3$—glass wool to remove any remaining $H_2S$. Then methyl mercaptan is collected for identification by precipitation in a silver nitrate solution.

The catalysts used are prepared as follows:

NiS on $Al_2O_3$:

A solution of 100 g. of $Ni(OOCCH_3)_2 \cdot 4H_2O$ in 450 cc. of water and 50 cc. of acetic acid is added under vacuo to 280 g. of $Al_2O_3$ previously heated in vacuo at 100° C. for 1 hour. Then $H_2S$ is passed through the mixture with stirring and the NiS on $Al_2O_3$ formed is dried in vacuo.

$Cr_2O_3$ on $Al_2O_3$:

To a solution of 38.5 g. of $Cr(NO_3)_2 \cdot 9H_2O$ in 310 cc. of water, 320 g. of $Al_2O_3$ is added and the liquid evaporated at 40° to 50° C. in vacuo. The residue is charged to a stainless steel tube and a slow air stream passed through at 400° C.

The following Table II indicates various conditions used to obtain methyl mercaptan.

*Table II*

| Catalyst (100 cc.) | Mole ratio carbon oxide: $H_2S$:$H_2$ | Space velocity (liters of gas [a] per liter of catalyst per hour) | Reactor temp., °C. Bottom | Reactor temp., °C. Top | Run duration, hours | Moles of gas used $CO_2$ | Moles of gas used CO | Moles of gas used $H_2S$ | Moles of gas used $H_2$ |
|---|---|---|---|---|---|---|---|---|---|
| NiS on $Al_2O_3$ f* | 1:2:1.6 | 334 | 330 | 160 | 7.0 | 2.345 | | 4.69 | 3.75 |
| NiS on $Al_2O_3$ r* | 1:1:3 | 625 | 420–430 | 220–230 | 6.0 | 3.35 | | 3.35 | 10.05 |
| NiS on $Al_2O_3$ r | 1:2:1.6 | 334 | 330 | 160 | 7.2 | | 2.345 | 4.69 | 3.75 |
| NiS on $Al_2O_3$ r | 1:3:4 | 400 | 400 | 200 | 9.0 | | 2.0 | 6.0 | 8.0 |
| $Cr_2O_3$ on $Al_2O_3$ [b] f | 1:3:4 | 400 | 320–325 | 185–190 | 7.0 | 1.56 | | 4.68 | 6.24 |
| $Cr_2O_3$ on $Al_2O_3$ [b] r | 1:3:4 | 400 | 370–380 | | 7.0 | 1.56 | | 4.68 | 6.24 |

*f=Fresh catalyst, r=Catalyst from previous run was reused.
[a] At standard conditions. [b] Converted to chromium sulfide in situ.

As many changes and variations may be made by the skilled art worker, it will be understood that the above description does not limit the spirit and scope of the invention.

We claim:

1. A process for the manufacture of methyl mercaptan which comprises reacting a carbon oxide, hydrogen and hydrogen sulfide in the presence of a sulfactive hydrogenation catalyst and an amine selected from the group of aliphatic, cycloaliphatic and saturated heterocyclic amines, said amine containing from one to six carbon atoms in each of said aliphatic, cycloaliphatic and saturated heterocyclic radicals and said process being carried out at a temperature between about 100° C. and about 400° C. and at a pressure of at least about 15 atmospheres.

2. The process of claim 1 where the sulfactive catalyst is a metal sulfide selected from the group of iron, nickel, cobalt and molybdenum.

3. The process of claim 2 phere the catalyst is nickel sulfide.

4. The process of claim 2 where the catalyst is nickel sulfide supported on alumina.

5. The process of claim 2 where the catalyst is cobalt sulfide.

6. The process of claim 2 where the catalyst is iron sulfide.

7. The process of claim 2 where the catalyst is molybdenum sulfide.

8. The process of claim 1 where the carbon oxide is carbon dioxide.

9. The process of claim 1 where the carbon oxide is carbon monoxide.

10. The process of claim 1 where the amine is a heterocyclic amine.

11. The process of claim 10 where the amine is piperidine.

12. The process of claim 1 where the amine is an aliphatic amine.

13. The process of claim 12 where the amine is triethylamine.

14. The process of claim 12 where the amine is diisopropylamine.

15. The process of claim 1 where the amine is a cycloaliphatic amine.

16. The process of claim 15 where the amine is dicyclohexylamine.

17. The process of claim 1 carried out in the vapor phase.

References Cited in the file of this patent

UNITED STATES PATENTS

| | | |
|---|---|---|
| 1,625,924 | Woodruff et al. | Apr. 26, 1927 |
| 2,816,146 | Doumani | Dec. 10, 1957 |

FOREIGN PATENTS

| | | |
|---|---|---|
| 334,924 | Great Britain | Sept. 12, 1930 |

OTHER REFERENCES

Emmett: Catalysis, vol. III, Chapter 8, pages 378–381 (1955), Reinhold Pub. Co., New York, N.Y.